United States Patent
Henderson et al.

(10) Patent No.: US 12,508,675 B1
(45) Date of Patent: Dec. 30, 2025

(54) BRAZE TAPE WITH CENTRAL REGION WITH LOW AND HIGH MELTING TEMPERATURE ALLOY MATERIAL, AND RELATED METHOD

(71) Applicant: GE Infrastructure Technology LLC, Greenville, SC (US)

(72) Inventors: Brian Leslie Henderson, Simpsonville, SC (US); Shan Liu, Central, SC (US); Daniel James Dorriety, Travelers Rest, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/808,291

(22) Filed: Aug. 19, 2024

(51) Int. Cl.
   B23K 35/00 (2006.01)
   B23K 1/00 (2006.01)
   B23K 35/02 (2006.01)

(52) U.S. Cl.
   CPC ............ B23K 35/0233 (2013.01); B23K 1/00 (2013.01); B23K 35/0238 (2013.01)

(58) Field of Classification Search
   CPC .......... B23K 35/0233–0238; B23K 1/00–206; B23K 2101/001
   USPC ................................ 228/56.3, 119, 245–246
   See application file for complete search history.

(56) References Cited

U.S. PATENT DOCUMENTS

| | | | |
|---|---|---|---|
| 5,952,042 A | 9/1999 | Rafferty et al. | |
| 6,416,709 B1 | 7/2002 | Rafferty et al. | |
| 7,565,996 B2 * | 7/2009 | Das | B23K 20/02 228/248.1 |
| 7,658,315 B2 | 2/2010 | Budinger et al. | |
| 7,690,551 B2 * | 4/2010 | You Yang | H01L 24/83 228/208 |
| 7,749,613 B2 | 7/2010 | Koshigoe et al. | |
| 7,776,454 B2 * | 8/2010 | Chang | B32B 15/01 428/688 |
| 8,348,139 B2 * | 1/2013 | Liu | B23K 35/262 228/56.3 |
| 9,828,915 B2 | 11/2017 | Miranda et al. | |
| 11,059,132 B2 * | 7/2021 | Ozbaysal | B23K 35/3605 |
| 11,123,796 B2 | 9/2021 | Kottilingam et al. | |

(Continued)

FOREIGN PATENT DOCUMENTS

| CN | 1463302 A | * 12/2003 | ............. C23C 10/30 |
|---|---|---|---|
| CN | 101272880 B | * 3/2012 | ............. B23K 1/002 |

(Continued)

OTHER PUBLICATIONS

IBM Technical Disclosure Bulletin NN8107952 (Jul. 1, 1981).*

*Primary Examiner* — Kiley S Stoner
(74) *Attorney, Agent, or Firm* — James Pemrick; Charlotte Wilson; Hoffman Warnick LLC

(57) ABSTRACT

A braze tape includes a first portion, a second portion, and a central portion located between and adjacent to the first portion and the second portion. The first portion includes a low melting temperature alloy material, the second portion includes a high melting temperature alloy material, and the central portion includes a mixture of the low melting temperature alloy material and the high melting temperature alloy material. The central portion may gradually change between the low melting temperature alloy material and the high melting temperature alloy material. A related method is also disclosed.

23 Claims, 9 Drawing Sheets

(56) References Cited

U.S. PATENT DOCUMENTS

| | | | | |
|---|---|---|---|---|
| 2003/0234280 | A1* | 12/2003 | Cadden | B23K 35/0233 228/246 |
| 2004/0134966 | A1* | 7/2004 | Chang | B23K 35/325 228/56.3 |
| 2005/0156325 | A1* | 7/2005 | You Yang | H01L 24/83 257/E21.51 |
| 2006/0131359 | A1* | 6/2006 | Pohlman | C22C 14/00 228/56.3 |
| 2007/0039177 | A1* | 2/2007 | Yoshioka | B23P 6/007 29/402.09 |
| 2008/0017694 | A1* | 1/2008 | Schnell | B23K 35/30 228/262.9 |
| 2011/0220704 | A1* | 9/2011 | Liu | H01L 24/83 428/646 |
| 2011/0290458 | A1* | 12/2011 | Gruenenwald | F28F 19/06 165/157 |
| 2015/0174707 | A1* | 6/2015 | Li | B23K 1/00 427/142 |
| 2015/0352673 | A1* | 12/2015 | Kamel | C22C 19/058 428/607 |
| 2017/0100805 | A1* | 4/2017 | Daniels | C25D 3/12 |
| 2017/0259385 | A1* | 9/2017 | Baer | C22C 19/07 |
| 2018/0043476 | A1* | 2/2018 | Ishigami | B23K 35/28 |
| 2018/0345420 | A1* | 12/2018 | Jacoby | B23K 35/286 |
| 2020/0368852 | A1* | 11/2020 | Ren | C22C 21/16 |
| 2024/0139887 | A1* | 5/2024 | Nitta | C09J 7/35 |
| 2024/0238909 | A1* | 7/2024 | Zonker | B23K 35/288 |

FOREIGN PATENT DOCUMENTS

| | | | | | |
|---|---|---|---|---|---|
| CN | 103155127 | A | * | 6/2013 | B23K 35/3013 |
| CN | 104284999 | A | * | 1/2015 | B23K 35/325 |
| CN | 106001826 | A | * | 10/2016 | B23K 1/20 |
| CN | 106862694 | A | * | 6/2017 | B23K 1/20 |
| CN | 108340097 | A | | 7/2018 | |
| CN | 109465561 | A | * | 3/2019 | B23K 35/0238 |
| CN | 113000960 | A | * | 6/2021 | B23K 35/302 |
| CN | 115070254 | A | * | 9/2022 | B23K 35/0222 |
| CN | 118338984 | A | * | 7/2024 | C22C 21/08 |
| DE | 102006058376 | A1 | * | 4/2008 | B23K 35/22 |
| DE | 102009053666 | A1 | * | 7/2010 | C22C 1/11 |
| DE | 102011001240 | A1 | * | 9/2012 | B23K 35/38 |
| EP | 0712681 | A2 | * | 5/1996 | F28F 21/084 |
| EP | 2774710 | A1 | * | 9/2014 | F01D 5/005 |
| EP | 4411792 | A1 | * | 8/2024 | C22C 13/02 |
| JP | 2012521951 | A | * | 9/2012 | B23K 35/005 |
| JP | 2014098185 | A | * | 5/2014 | B22D 7/005 |
| KR | 20170121583 | A | * | 11/2017 | B32B 15/20 |
| KR | 20230169164 | A | * | 12/2023 | B23K 35/286 |
| KR | 20240035487 | A | * | 3/2024 | F28F 21/084 |
| WO | WO-2009148168 | A1 | * | 12/2009 | B23K 1/0008 |
| WO | WO-2010112342 | A1 | * | 10/2010 | B23K 35/32 |
| WO | WO-2022191109 | A1 | * | 9/2022 | C22C 12/00 |

* cited by examiner

BRAZE TAPE WITH CENTRAL REGION WITH LOW AND HIGH MELTING TEMPERATURE ALLOY MATERIAL, AND RELATED METHOD

TECHNICAL FIELD

The disclosure relates generally to repairing industrial components. More specifically, the disclosure relates to a braze tape with a central region with low and high melting temperature material for repairing industrial components, and a related method.

BACKGROUND

Industrial components such as hot gas path components of a gas turbine system typically require repair after a duration of use. In some cases, deep and/or contoured openings in a component, such as a turbine nozzle or blade airfoils, caused by, for example, fill erosion and/or oxidation, must be re-filled with material to near net shape tolerances. In certain cases, these openings can be over 2.5 millimeters (mm) deep and can have a variety of irregular shapes. Braze tapes or pre-sintered preforms (PSPs) are typically used to repair damage to such openings and/or contoured surfaces of a component. Braze tapes are advantageous due to their flexibility and ability to fill the irregular shapes. Braze tapes are provided with homogenous mixtures of particle constituents as a single layer, or with discrete layers of single, homogenous materials. These braze tapes are limited in their ability to provide near net-shape surfaces for difficult shaped openings or contours and also withstand finish machining. For example, the finish machining may remove a homogenous harder exterior layer of material of the braze tape required for the surface of the component and expose another homogenous layer of the braze tape configured for adhesion to the component but inappropriate for the surface of the component. Hence, braze tape applicability is limited. Pre-sintered preforms provide similar layers of materials and present the same challenges as braze tapes. In addition, the layers of the PSPs are bonded together and are rigid. Consequently, PSPs are more difficult to use with irregularly shaped openings and contours in a component.

BRIEF DESCRIPTION

All aspects, examples and features mentioned below can be combined in any technically possible way.

An aspect of the disclosure provides a braze tape comprising: a first portion, a second portion, and a central portion located between and adjacent to the first portion and the second portion, and wherein the first portion includes a low melting temperature alloy material, the second portion includes a high melting temperature alloy material, and the central portion includes a mixture of the low melting temperature alloy material and the high melting temperature alloy material.

Another aspect of the disclosure includes any of the preceding aspects, and the first portion consists only of the low melting temperature alloy material.

Another aspect of the disclosure includes any of the preceding aspects, and the second portion consists only of the high melting temperature alloy material.

Another aspect of the disclosure includes any of the preceding aspects, and the first portion consists only of the low melting temperature alloy material, and the second portion consists only of the high melting temperature alloy material.

Another aspect of the disclosure includes any of the preceding aspects, and the central portion includes the low melting temperature alloy material at a lower concentration than the high melting temperature alloy material near an interface between the central portion and the second portion.

Another aspect of the disclosure includes any of the preceding aspects, and the central portion includes the low melting temperature alloy material at a higher concentration than the high melting temperature alloy material near an interface between the central portion and the first portion.

Another aspect of the disclosure includes any of the preceding aspects, and a percentage of the low melting temperature alloy material to the high melting temperature alloy material changes according to a gradient along a thickness of the central portion.

Another aspect of the disclosure includes any of the preceding aspects, and the gradient is one of: a substantially linear gradient, a substantially logarithmic gradient, a positive or negative gradient and a stepped gradient.

Another aspect of the disclosure includes any of the preceding aspects, and a porosity of the braze tape is higher in the first portion than in the second portion.

Another aspect of the disclosure includes any of the preceding aspects, and a porosity of the second portion is lower than a porosity of the first portion, and a porosity of the central portion is lower than the porosity of the first portion and higher than the porosity of the second portion.

Another aspect of the disclosure includes any of the preceding aspects, and the braze tape further includes a side portion contiguous with the second portion and including the high melting temperature alloy material, the side portion extending along an end of the central portion and an end of the first portion.

Another aspect of the disclosure includes any of the preceding aspects, and the central portion constitutes no less than 90% of a thickness of the braze tape.

Another aspect of the disclosure includes any of the preceding aspects, and the braze tape is flexible.

Another aspect of the disclosure includes a braze tape comprising: a first low melting temperature alloy material portion consisting only of a low melting temperature alloy material; a second high melting temperature alloy material portion consisting only of a high melting temperature alloy material; and a central portion located between and adjacent to the first low melting temperature alloy material portion and the second high melting temperature alloy material portion, and wherein the central portion includes a mixture of the low melting temperature alloy material and the high melting temperature alloy material, wherein a percentage of the low melting temperature alloy material to the high melting temperature alloy material changes according to a gradient along a thickness of the central portion.

Another aspect of the disclosure includes any of the preceding aspects, and the central portion includes the low melting temperature alloy material at a lower concentration than the high melting temperature alloy material near an interface between the central portion and the second portion.

Another aspect of the disclosure includes any of the preceding aspects, and the central portion includes the low melting temperature alloy material at a higher concentration than the high melting temperature alloy material near an interface between the central portion and the first portion.

Another aspect of the disclosure includes any of the preceding aspects, and the braze tape is flexible.

Another aspect of the disclosure includes a method of repairing a component, the method comprising: placing a braze tape on a substrate of the component, the braze tape having a first portion, a second portion, and a central portion located between the first portion and the second portion, the first portion is placed in contact with the substrate; brazing the braze tape to the substrate; wherein the first portion includes a low melting temperature alloy material, the second portion includes a high melting temperature alloy material, and the central portion includes a mixture of the low melting temperature alloy material and the high melting temperature alloy material, wherein a percentage of the low melting temperature alloy material to the high melting temperature alloy material changes according to a gradient along a thickness of the central portion; and wherein the brazing heats the braze tape to a temperature less than a melting temperature point of the high melting temperature alloy material.

Another aspect of the disclosure includes any of the preceding aspects, and the first portion consists only of the low melting temperature alloy material.

Another aspect of the disclosure includes any of the preceding aspects, and the second portion consists only of the high melting temperature alloy material.

Another aspect of the disclosure includes any of the preceding aspects, and the first portion consists only of the low melting temperature alloy material, and the second portion consists only of the high melting temperature alloy material.

Another aspect of the disclosure includes any of the preceding aspects, and the central portion includes the low melting temperature alloy material at a lower concentration than the high melting temperature alloy material near an interface between the central portion and the second portion.

Another aspect of the disclosure includes any of the preceding aspects, and the central portion includes the low melting temperature alloy material at a higher concentration than the high melting temperature alloy material near an interface between the central portion and the first portion.

Another aspect of the disclosure includes any of the preceding aspects, and the braze tape is flexible.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
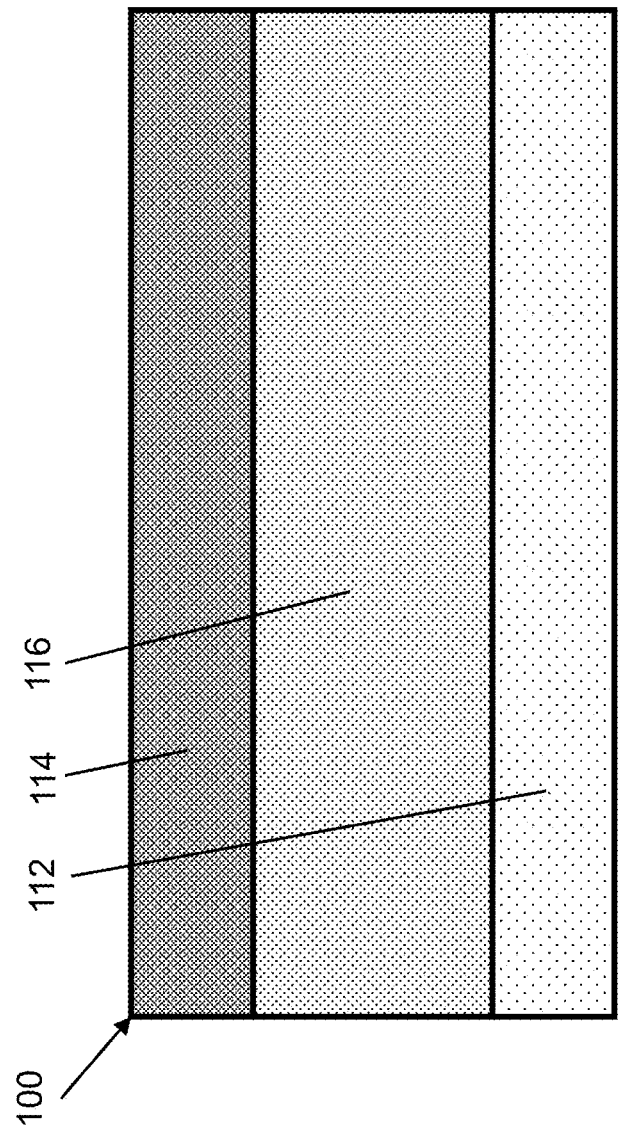
FIG. 1 shows a schematic cross-sectional of a braze tape according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

In addition, several descriptive terms may be used regularly herein, and it should prove helpful to define these terms at the onset of this section. These terms and their definitions, unless stated otherwise, are as follows. The terms "first," "second," and "third," may be used interchangeably to distinguish one component from another and are not intended to signify location or importance of the individual components. The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occur or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments of the disclosure include a braze tape and a related method. The braze tape includes a first portion, a second portion, and a central portion located between and adjacent to the first portion and the second portion. The first portion includes a low melting temperature alloy material, the second portion includes a high melting temperature alloy material, and the central portion includes a mixture of the low melting temperature alloy material and the high melting temperature alloy material. The central portion may gradually change between the low melting temperature alloy material and the high melting temperature alloy material. The braze tape is applicable to a wider range of repairs compared to conventional braze tapes and PSPs, such as difficult to fill erosion and/or oxidation on contoured side walls of internal gas turbine components. The low melting temperature alloy material on the first portion that contacts the component ensures adhesion and filling of irregular shapes. Since the central portion includes the high melting temperature alloy material, any finish machining that reaches it still includes the high melting temperature alloy material required for the surface of the component.

FIGS. 1-7 show schematic cross-sectional views of a braze tape 100 according to various embodiments of the disclosure. As will be described herein, braze tape 100 may be used to repair a component 102 (FIGS. 8-9) using a method according to embodiments of the disclosure.

Braze tape 100 includes a first portion 112, a second portion 114, and a central portion 116. Central portion 116 is located between, and adjacent to each of, first portion 112 and second portion 114.

In certain embodiments, first portion 112 includes a low melting temperature alloy material. In other embodiments, first portion 112 consists only of the low melting temperature alloy material. The low melting temperature material (hereafter "LMTA material") may include but is not limited to: DF4B, B1P, AMS4782, D15, BNi-9, BNi-5, B93, and the like. First portion 112 may also be referenced as a first LMTA material portion.

In certain embodiments, second portion 114 includes a high melting temperature alloy material. In other embodiments, second portion 114 consists only of the high melting temperature alloy material. Further, in certain embodiments, first portion 112 consists only of the LMTA material, and second portion 114 consists only of the high melting temperature alloy material. The high melting temperature material (hereafter "HMTA material") may include but is not limited to: Mar-M247, Rene 142, Rene 80, Rene 108, Inconel 738, GT-33, and the like. Second portion 114 may also be referenced as a second HMTA material portion.

A non-limiting list of possible HMTA with LMTA material combinations may include in order: Mar-M247 and DF4B; Rene142 and BIP; and Rene 80 and AMS4782. Other combinations are also possible. The HMTA material has a higher melting temperature than any other material in braze tape 100, and the LMTA material has a lower melting temperature than any other material in braze tape 100. Hence, the HMTA material has the highest melting point of braze tape 100, and the LMTA material has the lowest melting point of braze tape 100. In one non-limiting example, the LMTA material may have a melting point at least 200° Celsius less than the HMTA material. Braze tape 100 is flexible and thus can be curved, bent, turned, bumped, or otherwise modified, to mate with practically any form of irregularly shaped opening and/or contour of a component in which used. Braze tape 100 is not a rigid, pre-sintered preform (PSP) because the different portions are not directly bonded together, e.g., with a binder.

Figure 2:
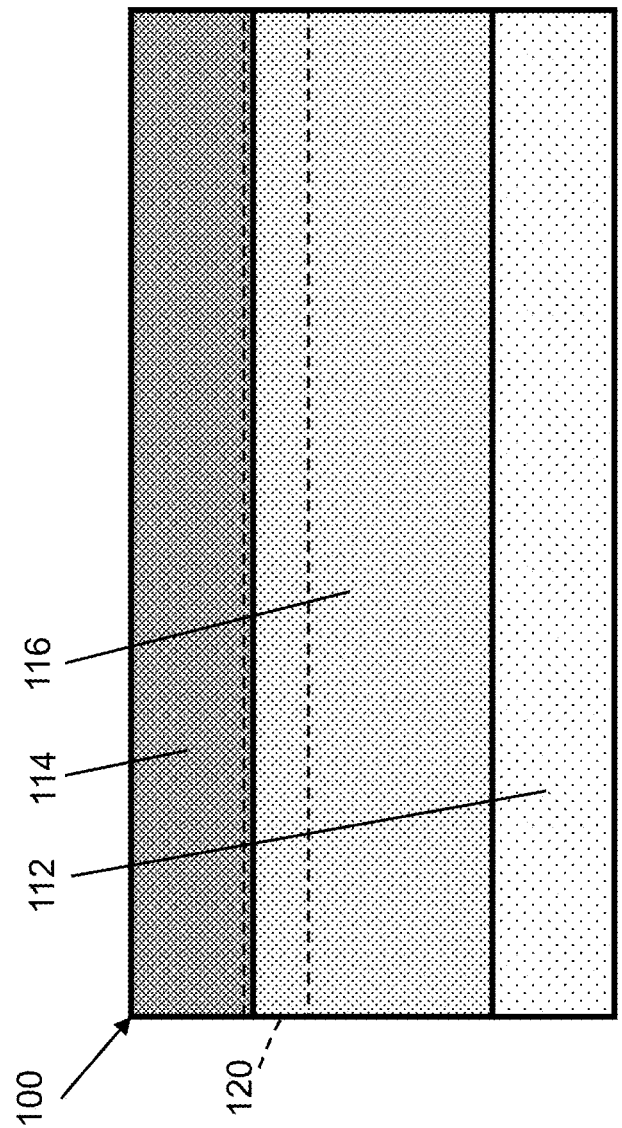
FIG. 2 shows a schematic cross-sectional of a braze tape according to other embodiments of the disclosure.
Figure 3:
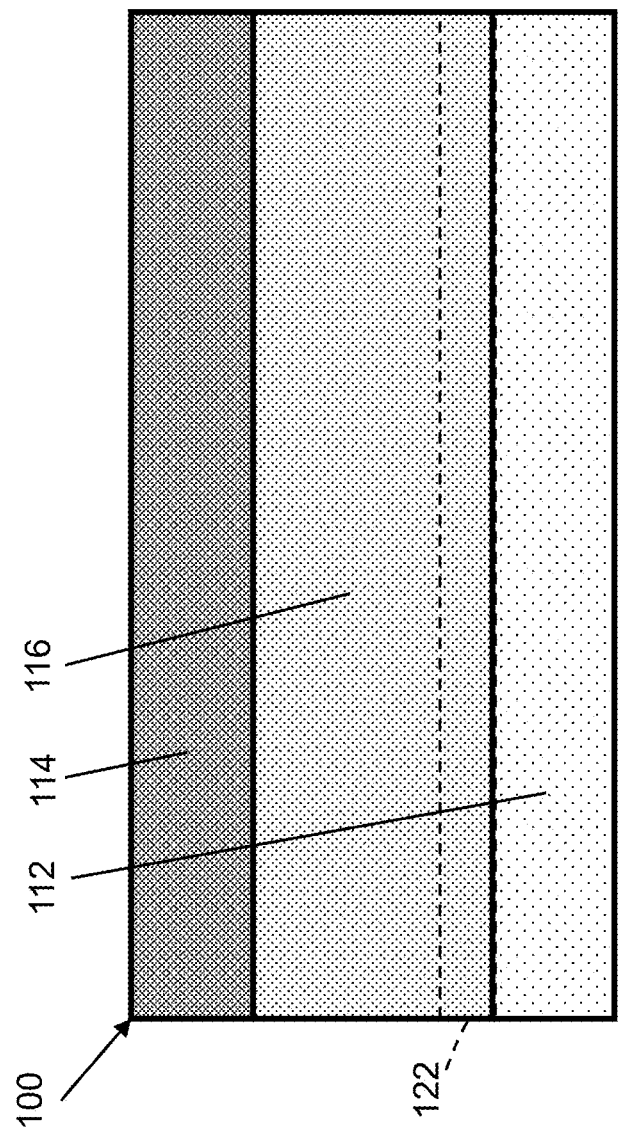
FIG. 3 shows a schematic cross-sectional of a braze tape according to additional embodiments of the disclosure.

Central portion 116 includes a mixture of the LMTA material and the HMTA material. That is, central portion 116 includes both LMTA material and HMTA material. In certain embodiments, as shown in FIG. 2, central portion 116 includes the LMTA material at a lower concentration than the HMTA material near an interface 120 (dashed box) between central portion 116 and second portion 114. That is, a concentration of LMTA material is less than the HMTA near interface 120 in central portion 116. In other embodiments, as shown in FIG. 3, central portion 116 includes the LMTA material at a higher concentration than the HMTA material near an interface 122 (dashed box) between central portion 116 and first portion 112. That is, a concentration of LMTA material is higher than the HMTA material near interface 122 in central portion 116.

Figure 4:
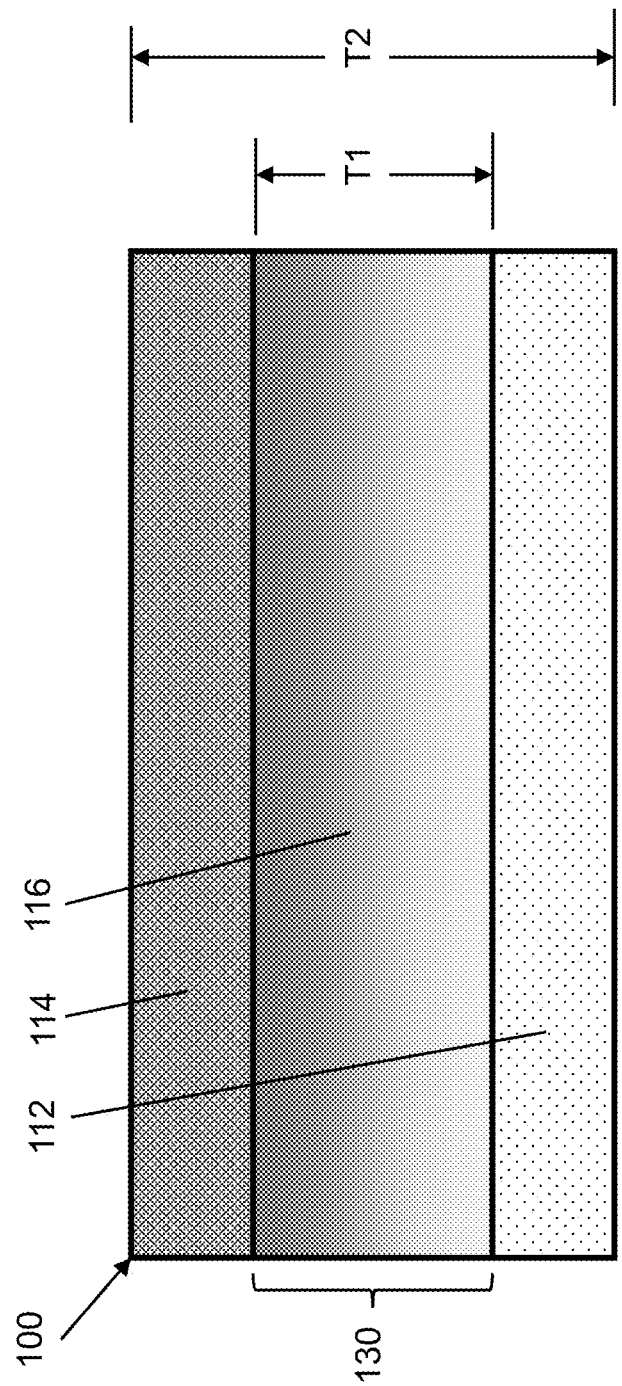
FIG. 4 shows a schematic cross-sectional of a braze tape according to further embodiments of the disclosure.
Figure 5:
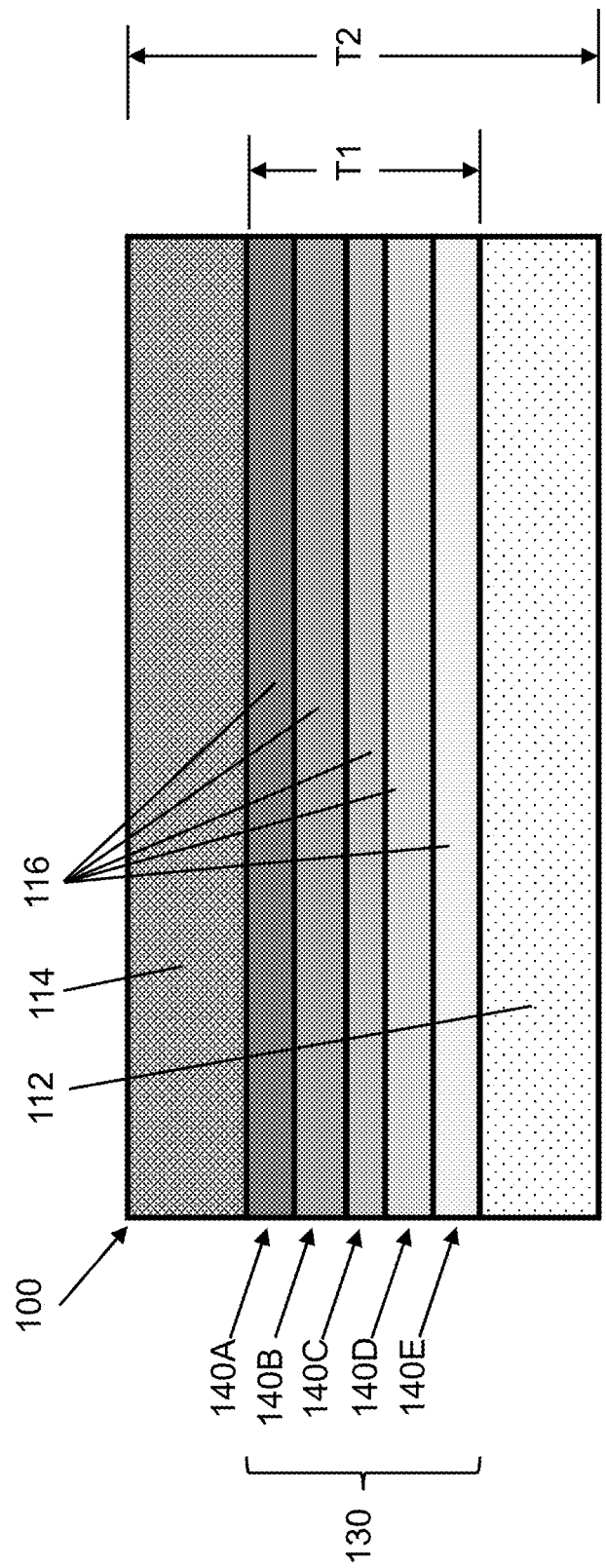
FIG. 5 shows a schematic cross-sectional of a braze tape according to other embodiments of the disclosure.

In other embodiments, as shown in FIG. 4, a percentage of the LMTA material to the HMTA material changes according to a gradient 130 along a thickness T1 of central portion 116. Gradient 130 can take any form to tailor the function of braze tape 100. For example, gradient 130 may be a substantially linear gradient or a substantially logarithmic gradient. In another example, gradient 130 may be a positive gradient relative to, for example, the HMTA material with a gradually increasing concentration from first portion 112 towards second portion 114. Conversely, gradient 130 may be a positive gradient relative to, for example, the HMTA material with a gradually decreasing concentration from first portion 112 towards second portion 114. The positive and negative gradients may also be applied relative to the LMTA material concentration. In another example, as shown in FIG. 5, gradient 130 may be a stepped gradient, i.e., with each successive discrete layer, e.g., 140A-E, having increasing or decreasing concentrations of LMTA to HMTA or HMTA to LMTA materials. Any number of discrete layer 140 can be used, and they may have any thickness. The discrete layers 140A-E may or may not have the same thickness.

Regardless of form, gradient 130 can be tailored to provide the desired functionality for braze tape 100 through its thickness T1. For example, the LMTA material of first portion 112, which may contact the area to be repaired on component 102 (FIGS. 8-9) may be configured to provide desired adhesion of braze tape 100 into an opening or a contoured surface 104 (FIGS. 8-9) in component 102 (FIGS. 8-9), which may or may not be smooth. Similarly, the HMTA material of second portion 114 may be configured to have similar or identical properties to surface 104 (FIGS. 8-9) of component 102 (FIGS. 8-9) in which braze tape 100 is used. The HMTA material of second portion 114 also prevents adhesion to external tools due to its higher melting temperature.

Figure 6:
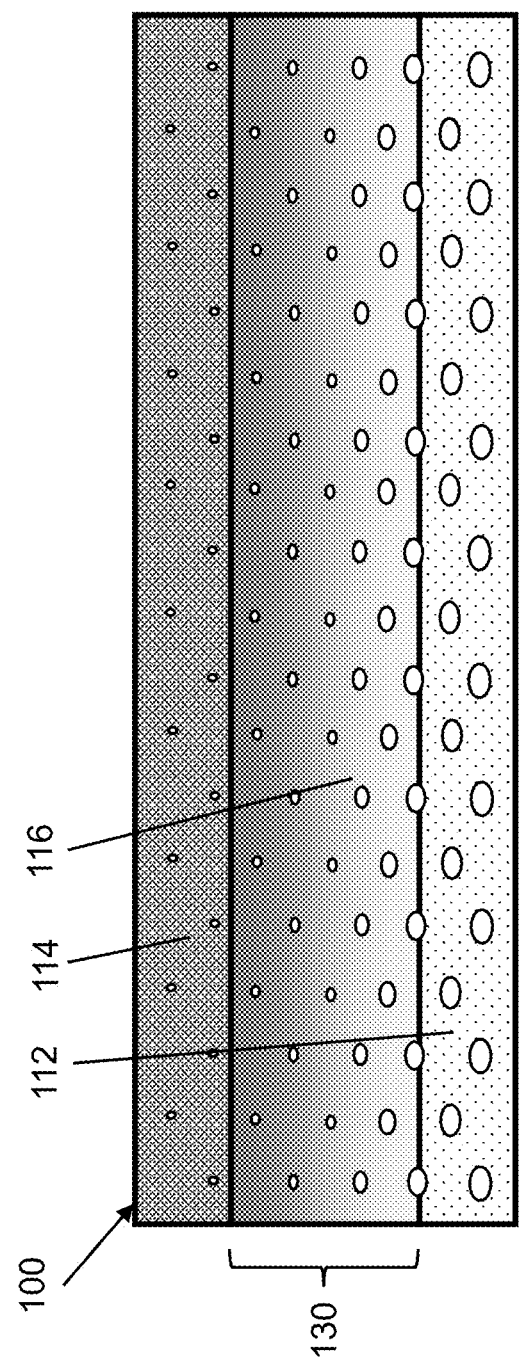
FIG. 6 shows a schematic cross-sectional of a braze tape according to embodiments of the disclosure.

As shown in FIG. 6, in certain embodiments, braze tape 100 may also include a porosity that is higher in first portion 112 than in second portion 114—see larger pores in first portion 112 compared to second portion 114. "Porosity," as used herein, is a ratio of open space volume to total volume of the stated structure, e.g., portions 112, 114, 116 thereof. Typically, in this regard, porosity is stated as a percentage of volume of open space to overall or total volume of the stated structure. For example, in certain embodiments, most-dense portion, e.g., second portion 114, has a porosity in a range of 0% to 2.9% and a least-dense portion, e.g., first portion 112, has a porosity in a range of 3 to 4.9%. As noted, a most-dense portion may also be considered solid, i.e., 0% porous. In some cases, the open space is empty areas in a solid material in the form of "pores" (see, e.g., FIG. 6), i.e., small, individual open spaces, which may include interconnecting passages in the material of the stated structure, e.g., three dimensional passages. As used herein, a three-dimensional boundary of a porous portion or sub-portion for purpose of identifying a "total volume" thereof can be identified by where a change in porosity of greater than 0.1% relative to an adjacent portion or sub-portion occurs. "Open space volume" is collectively a three-dimensional space that is empty, i.e., a void, gap, empty space and/or not filled with material, within a portion or sub-portion. As used herein, "different porosities" or "differences in porosity," generally means any variety of characteristics such as: percentage of open space volume to total volume, a number of pores or other open space in a given volume, the volume (i.e., size) of pores or other open space, shape of pores or open space, and variations in connecting passages between pores or other open space that may not be recognized as actual discrete pores or open space. As one non-limiting example only, pore size can be in a range of, for example, $1.715 \times 10^{-5}$ to $6.542 \times 10^{-2}$ cubic millimeters ($1.000 \times 10^{-9}$ to $3.992 \times 10^{-6}$ cubic inches). In certain embodiments, the pores can be spherical and can have a diameter in a range of 0.030 millimeters (mm) to 0.50 mm (0.0012 inches to 0.0197 inches). Other shapes of porosity are also possible for graded porosity arrangements so long as the percentage and variation fall within the stated ranges. With differences in, for example, pore shape or pore connecting passages, it will be recognized that differences in porosity may not be exclusively based on percentage of open space volume to total volume. However, where differences in porosities are compared in terms of degree, e.g., higher or lower, the difference referenced is exclusively that of the volume characteristics, i.e., percentage of open space volume to total volume.

In one example, a porosity of second portion 114 is lower than a porosity of first portion 112, and a porosity of central portion 116 is lower than the porosity of first portion 112 and higher than the porosity of second portion 114. As illustrated, central portion 116 includes a gradually changing porosity becoming less porous from bottom to top. That is, a porosity is higher near the LMTA material in first portion 112, and lower near the HMTA material in second portion 114. Second portion 114 is denser than central portion 116, and second portion 114 and central portion 116 are denser than first portion 112.

Figure 7:
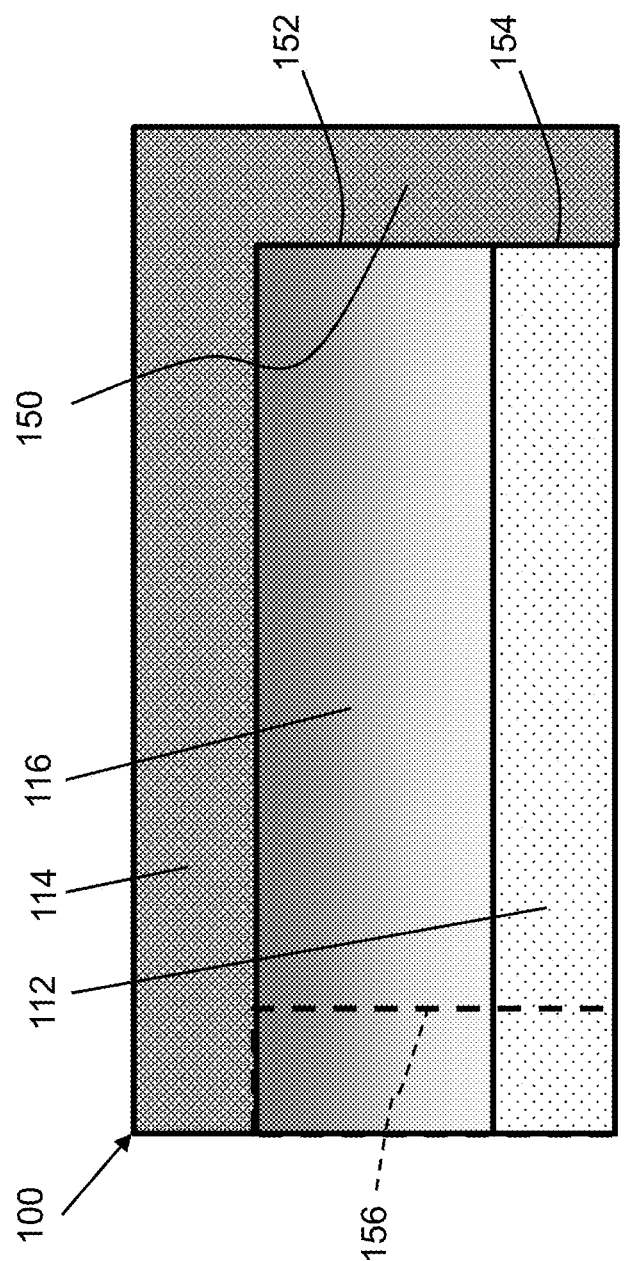
FIG. 7 shows a schematic cross-sectional of a braze tape according to additional embodiments of the disclosure.

FIG. 7 shows a schematic cross-sectional view of another embodiment of braze tape 100. In this case, braze tape 100 further includes a side portion 150 contiguous with second portion 114 and including the HMTA material. Side portion 150 may extend vertically along any extent of central portion 116 and, if desired, first portion 112. In the example shown, side portion 150 extends along an end 152 of central portion 116 and an end 154 of first portion 112. While side portion 150 is shown on one end of central portion 116 and first portion 112, it also may be on an opposing end of each (see dashed box 156).

Braze tape 100 may be made using any now known or later developed tape formation techniques such as but not limited to controlled sintering, like laser cladding, with feeding from two different supplies at different rates to gradually adjust constituents.

Figure 8:
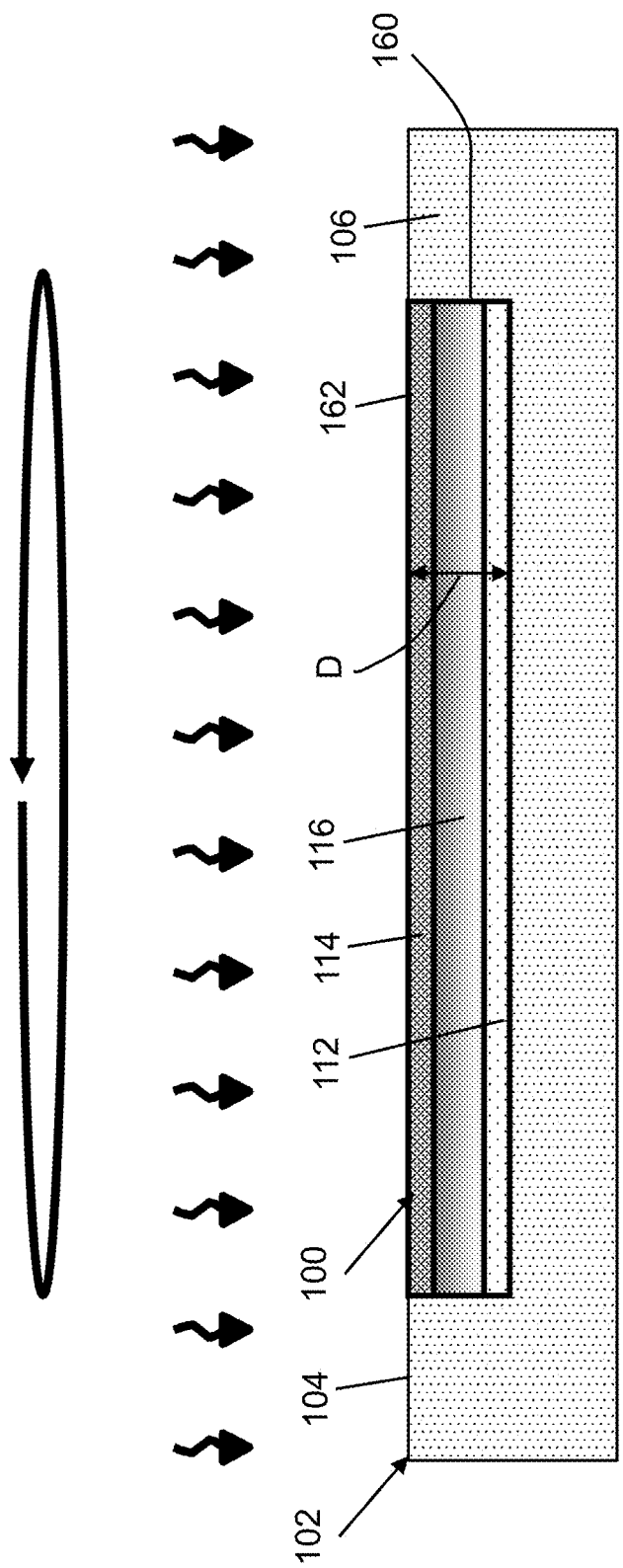
FIG. 8 shows a schematic cross-sectional of a method of repairing a component using a braze tape according to embodiments of the disclosure.
Figure 9:
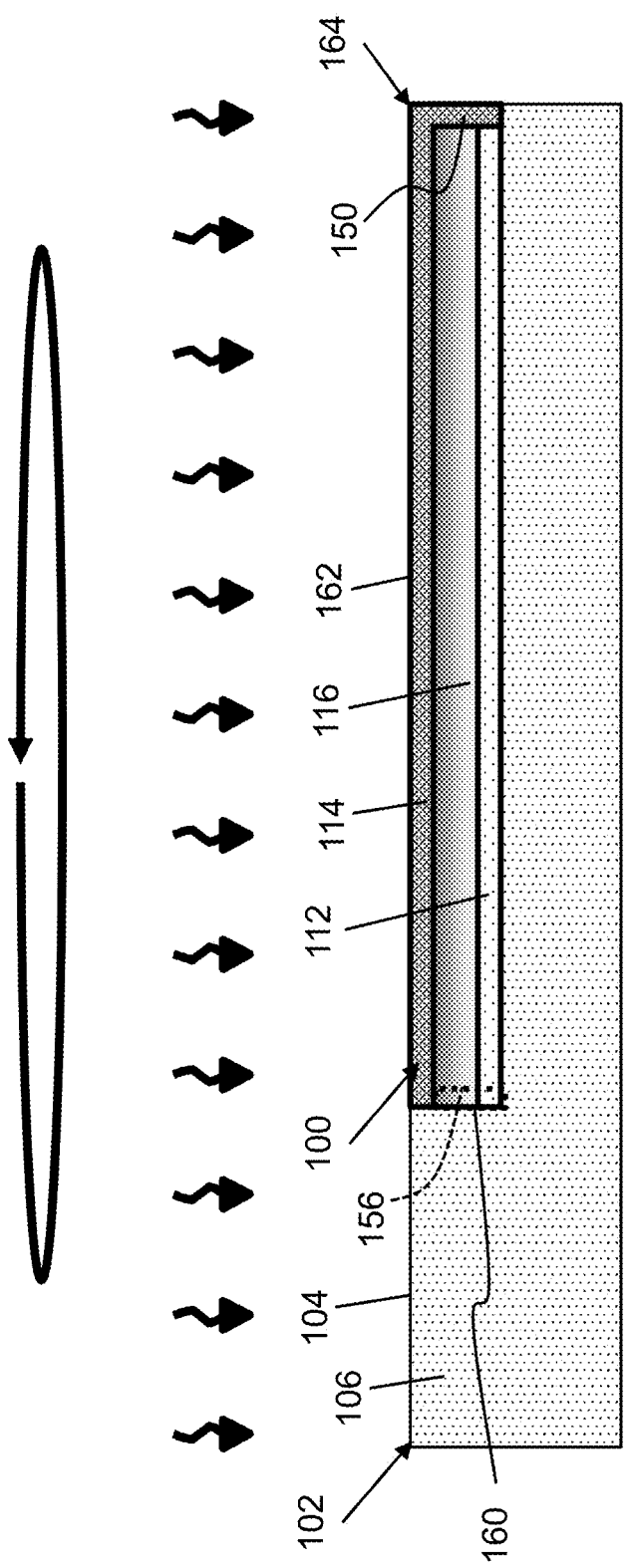
FIG. 9 shows a schematic cross-sectional of a method of repairing a component using a braze tape according to embodiments of the disclosure.

FIGS. 8 and 9 show schematic cross-sectional views of a method of repairing component 102, according to various embodiments of the disclosure. Referring to FIG. 8, a method may include placing braze tape 100 on a substrate 106 of component 102. Braze tape 100 may be any of the embodiments, as described herein. As shown, at least first portion 112 is placed in contact with substrate 106. Substrate 106 of component 102 may include any portion of component 102. In the example shown, substrate 106 includes some form of opening 160 in which braze tape 100 fits. In one non-limiting example, opening 160 could have a depth D over 2.5 millimeters (mm) deep, and, although not shown, can have a variety of irregular shapes. Braze tape 100 is shown coplanar with surface 104 of substrate 106 of component 102; however, an upper surface 162 of braze tape 100 may be below surface 104 of substrate 106 or extend (vertically as shown) above surface 104 of substrate 106.

In a non-limiting example, where component 102 is a turbine nozzle or blade airfoil or another part of the turbine along a hot gas path thereof, component 102 may include any of a variety of superalloys. As used herein, "superalloy" refers to an alloy having numerous excellent physical characteristics compared to conventional alloys, such as but not limited to: high mechanical strength, high thermal creep deformation resistance. Superalloys may include but are not limited to: Rene 108, CM247, Haynes alloys, Incalloy, MP98T, TMS alloys, CMSX single crystal alloys. In one embodiment, superalloys for which teachings of the disclosure may be especially advantageous are those superalloys having a high gamma prime (γ') value. "Gamma prime" (γ') is the primary strengthening phase in nickel-based alloys. Example high gamma prime superalloys include but are not limited to: Rene 108, N5, GTD 444, MarM 247 and IN 738. The HMTA material of second portion 114 and central portion 116 may be the same as or at least compatible with the material of substrate 106 of component 102. "Compatible" indicates they have similar physical characteristics and do not chemically interact in a deleterious manner.

FIG. 8 also shows brazing braze tape 100 to substrate 106 (see curved arrows). The brazing may include heating at least braze tape 100 to a temperature less than a melting temperature point of the HMTA material. Once brazed, any now known or later developed finishing machining (circular arrow) can be carried out to smooth and/or meld upper surface 162 of braze tape 100 and surface 104 of component 102. The finishing machining may, for example, remove any excess material of braze tape 100 and/or surface 104 of substrate 106 of component 102 to provide a smooth, contiguous surface. Because the HMTA material of second portion 114 (and central portion 116) may be the same as, or at least compatible with, the material of substrate 106 of component 102. As a result, the repaired component (and in particular the location where braze tape 100 is used) may exhibit the same functionality and advantages of the materials of substrate 106 of component 102.

FIG. 9 shows the same methodology as FIG. 8 but using braze tape 100 of FIG. 7 with side portion 150 (and perhaps 156). As shown in FIG. 9, braze tape 100 may be used to repair, among other locations, a corner 164 of substrate 106 of component 102.

FIGS. 6-9 show central portion 116 with a gradient as in the FIG. 4 embodiment. It is emphasized, however, central portion 116 can take any form described herein.

With regard to overall thickness, in certain embodiments, central portion 116 constitutes no less than 90% of a thickness of the braze tape 100, with first portion 112 and second portion 114 constituting the other 10% of the overall thickness. In other embodiments, central portion 116 constitutes no less than 95% of a thickness of the braze tape 100, with first portion 112 and second portion 114 constituting the other 5% of the overall thickness.

Embodiments of the disclosure provide various technical and commercial advantages, examples of which are discussed herein. The braze tape is applicable to a wider range of repairs compared to conventional braze tapes and PSPs, such as difficult to fill erosion and/or oxidation on contoured side walls of internal gas turbine components. The low melting temperature alloy material on the first portion that contacts the component ensures adhesion and filling of irregular shapes. Since the central portion includes the high melting temperature alloy material, any finish machining that reaches through the second portion still includes the high melting temperature alloy material required for the surface of the component.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application of the technology and to enable others of ordinary skill in the art to understand the disclosure for contemplating various modifications to the present embodiments, which may be suited to the particular use contemplated.

What is claimed is:

1. A braze tape comprising:
   a first portion, a second portion, and a central portion located between and adjacent to the first portion and the second portion, and wherein:
      the first portion includes a low melting temperature alloy material,
      the second portion includes a high melting temperature alloy material,
      the central portion includes a mixture of the low melting temperature alloy material and the high melting temperature alloy material, and
      a porosity is higher in the first portion than in the second portion.

2. The braze tape of claim 1, wherein the first portion consists only of the low melting temperature alloy material.

3. The braze tape of claim 1, wherein the second portion consists only of the high melting temperature alloy material.

4. The braze tape of claim 1, wherein the first portion consists only of the low melting temperature alloy material, and the second portion consists only of the high melting temperature alloy material.

5. The braze tape of claim 1, wherein the central portion includes the low melting temperature alloy material at a lower concentration than the high melting temperature alloy material near an interface between the central portion and the second portion.

6. The braze tape of claim 1, wherein the central portion includes the low melting temperature alloy material at a higher concentration than the high melting temperature alloy material near an interface between the central portion and the first portion.

7. The braze tape of claim 1, wherein a percentage of the low melting temperature alloy material to the high melting temperature alloy material changes according to a gradient along a thickness of the central portion.

8. The braze tape of claim 7, wherein the gradient is one of: a substantially linear gradient, a substantially logarithmic gradient, a positive or negative gradient and a stepped gradient.

9. The braze tape of claim 1, wherein a porosity of the central portion is lower than the porosity of the first portion and higher than the porosity of the second portion.

10. The braze tape of claim 1, wherein the braze tape further includes a side portion contiguous with the second portion and including the high melting temperature alloy material, the side portion extending along an end of the central portion and an end of the first portion.

11. The braze tape of claim 1, wherein the central portion constitutes no less than 90% of a thickness of the braze tape.

12. The braze tape of claim 1, wherein the braze tape is flexible.

13. A braze tape comprising:
   a first low melting temperature alloy material portion consisting only of a low melting temperature alloy material;
   a second high melting temperature alloy material portion consisting only of a high melting temperature alloy material;
   a central portion located between and adjacent to the first low melting temperature alloy material portion and the second high melting temperature alloy material portion, and wherein the central portion includes a mixture of the low melting temperature alloy material and the high melting temperature alloy material, wherein a percentage of the low melting temperature alloy material to the high melting temperature alloy material changes according to a gradient along a thickness of the central portion; and
   a side portion contiguous with the second portion and including the high melting temperature alloy material, the side portion extending along an end of the central portion and an end of the first portion.

14. The braze tape of claim 13, wherein the central portion includes the low melting temperature alloy material at a lower concentration than the high melting temperature alloy material near an interface between the central portion and the second portion.

15. The braze tape of claim 13, wherein the central portion includes the low melting temperature alloy material at a higher concentration than the high melting temperature alloy material near an interface between the central portion and the first portion.

16. The braze tape of claim 13, wherein the braze tape is flexible.

17. A method of repairing a component, the method comprising:
   placing a braze tape on a substrate of the component, the braze tape having a first portion, a second portion, and a central portion located between the first portion and the second portion, the first portion is placed in contact with the substrate; and
   brazing the braze tape to the substrate,
   wherein:
      the first portion includes a low melting temperature alloy material, the second portion includes a high melting temperature alloy material, and the central portion includes a mixture of the low melting temperature alloy material and the high melting temperature alloy material, wherein a percentage of the low melting temperature alloy material to the high melting temperature alloy material changes according to a gradient along a thickness of the central portion;

wherein the brazing heats the braze tape to a temperature less than a melting temperature point of the high melting temperature alloy material, and a porosity of the braze tape is higher in the first portion than in the second portion.

18. The method of claim 17, wherein the first portion consists only of the low melting temperature alloy material.

19. The method of claim 17, wherein the second portion consists only of the high melting temperature alloy material.

20. The method of claim 17, wherein the first portion consists only of the low melting temperature alloy material, and the second portion consists only of the high melting temperature alloy material.

21. The method of claim 17, wherein the central portion includes the low melting temperature alloy material at a lower concentration than the high melting temperature alloy material near an interface between the central portion and the second portion.

22. The method of claim 17, wherein the central portion includes the low melting temperature alloy material at a higher concentration than the high melting temperature alloy material near an interface between the central portion and the first portion.

23. The method of claim 17, wherein the braze tape is flexible.

* * * * *